Figure 1:
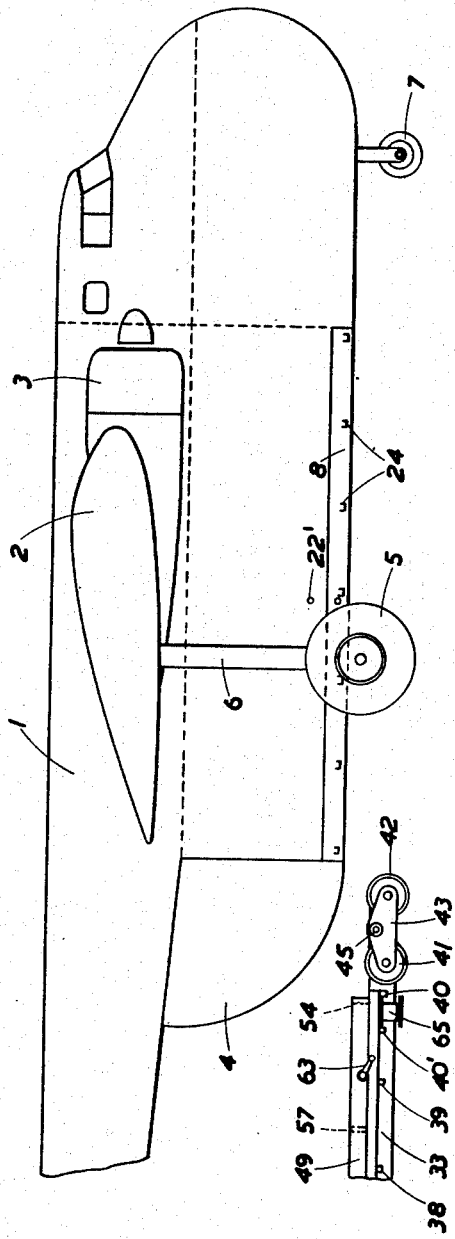

Sept. 21, 1954     F. A. GANNON     2,689,696
FREIGHT CARRYING AIRCRAFT
Filed Nov. 26, 1951     7 Sheets-Sheet 1

Inventor:
FRANK ALFRED GANNON
By
Richardson, David and Verdon
Attorneys

Sept. 21, 1954  F. A. GANNON  2,689,696
FREIGHT CARRYING AIRCRAFT
Filed Nov. 26, 1951  7 Sheets-Sheet 5

Inventor:
FRANK ALFRED GANNON
By
Richardson, David and Verdon
Attorneys

Sept. 21, 1954  F. A. GANNON  2,689,696
FREIGHT CARRYING AIRCRAFT
Filed Nov. 26, 1951   7 Sheets-Sheet 7

Inventor:
FRANK ALFRED GANNON
By
Richardson, David and Nordon
Attorneys

Patented Sept. 21, 1954

2,689,696

UNITED STATES PATENT OFFICE 2,689,696

FREIGHT CARRYING AIRCRAFT

Frank Alfred Gannon, Kogarah, Sydney, New South Wales, Australia, assignor of one-half to Blackburn and General Aircraft, Limited, Brough, England Application November 26, 1951, Serial No. 258,116

Claims priority, application Great Britain October 3, 1951

6 Claims. (Cl. 244—118)

This invention relates to freight carrying aircraft and is particularly, but not exclusively, concerned with large aircraft designed to carry a heavy load of freight.

There are at present several designs of freight carrying aircraft which are similar in that they are high wing monoplanes with the lower part of the fuselage constructed as a capacious freight compartment to which access may be obtained either at the front or, more customarily, at the back through large doors which open to expose the full area of the freight compartment.

With all freight carrying aircraft their effective utilisation is limited by the time occupied in emptying and reloading the freight compartment, and indeed in an attempt to obtain a greater utilisation, it has been proposed to construct a composite aircraft comprising a flying component and a separable freight compartment component which latter is joined to the former for transport purposes. This arrangement may give a greater utilisation to the flying component but it is still a lengthy operation to load and unload the freight compartment which can be accomplished only through the doorway thereof.

Now, therefore, the principal object of the present invention is to provide a freight carrying aircraft capable of high degree of utilisation (which is as good or greater than that of the composite aircraft just mentioned) in an arrangement which provides for greater ease and speed of loading and unloading.

With this object in view, a freight carrying aircraft having cargo space in the lower part of its fuselage closed off by doors which fully expose one end thereof has, in accordance with the present invention, a separately constructed detachable bottom member connected to the fuselage which forms a floor for the freight compartment. The bottom wall member is detachably connected to the fuselage by connecting means which may readily be detached for the quick removal of cargo and replacement by another floor already loaded. The bottom wall member of the freight compartment may be simply deposited on the ground and the aircraft towed or taxied away therefrom so that the cargo on such detached bottom wall member and the cargo supported thereon may emerge through the open doors of the freight compartment. It is, however, preferred to place the bottom wall member on a suitable vehicle so that such detachable bottom wall member and the cargo thereon may be bodily removed thereby whereafter that vehicle, or another such vehicle, may re-position another bottom wall member already loaded for connection to the aircraft. A suitable vehicle may, for example, comprise a main chassis structure which is supported at one end by a plurality of fixed wheels and at the other end by a plurality of steerable wheels through a universal coupling, an upper deck mounted for lateral displacement on the main chassis to register with the detachable bottom wall member of the freight compartment of the aircraft, and a plurality of jacks whereby the vehicle may be bodily elevated for its upper deck to engage and receive such detachable bottom wall member in proper alignment after any necessary adjustment of its upper deck, the upper deck of such vehicle being so shaped and formed of longitudinal and transverse members disposed so as evenly to support the detachable bottom wall member of the freight compartment of the aircraft.

Further according to the present invention, the detachable bottom wall member of the freight compartment is subdivided transversely intermediate its length into two or more sections which may be removed one after another.

In this way the loading and unloading of the aircraft may be accomplished more easily and much quicker than is at present possible, as the time taken to replace one bottom wall member by another is but a fraction of the time required to unload and reload the freight compartment and the unloading and loading of the detached bottom wall member is greatly accelerated as the freight can be handled at all four sides.

If the aircraft has to visit an aerodrome where there are no facilities for removing and replacing the bottom wall member of the freight compartment with another bottom wall member, it is still possible to effect quick unloading and loading by lowering the bottom wall member by jacks and then moving the aircraft to obtain access to the cargo from all four sides of the detached bottom wall member whereafter the aircraft may be moved back into position to permit the re-connection of the reloaded bottom wall member.

In order accurately to position the detachable bottom wall member for connection to the aircraft and accurately to position the vehicle to receive the detachable bottom wall member of an aircraft, datum marks are provided on the surface of the runway, loading bay, or the like, where the operation is to be carried out. These datum marks may merely comprise painted lines but they may otherwise take the form of grooves or projections which will serve to align the landing wheels of the aircraft and those of the vehicle used for transporting the detached bottom wall member.

Now in order that the invention may be clearly understood and readily carried into effect, an embodiment of one piece detachable bottom wall member for the freight compartment of an aircraft is by way of example hereinafter more fully described with reference to the accompanying substantially diagrammatic drawings which are given for purposes of illustration only and not of limitation.

Figure 2:
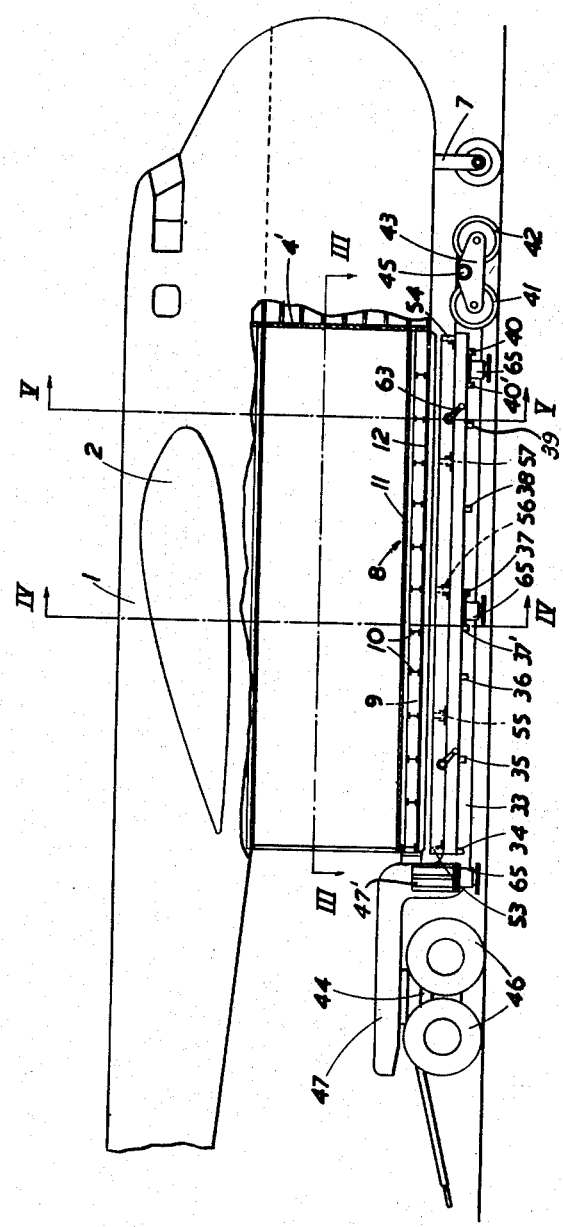
Figure 3:
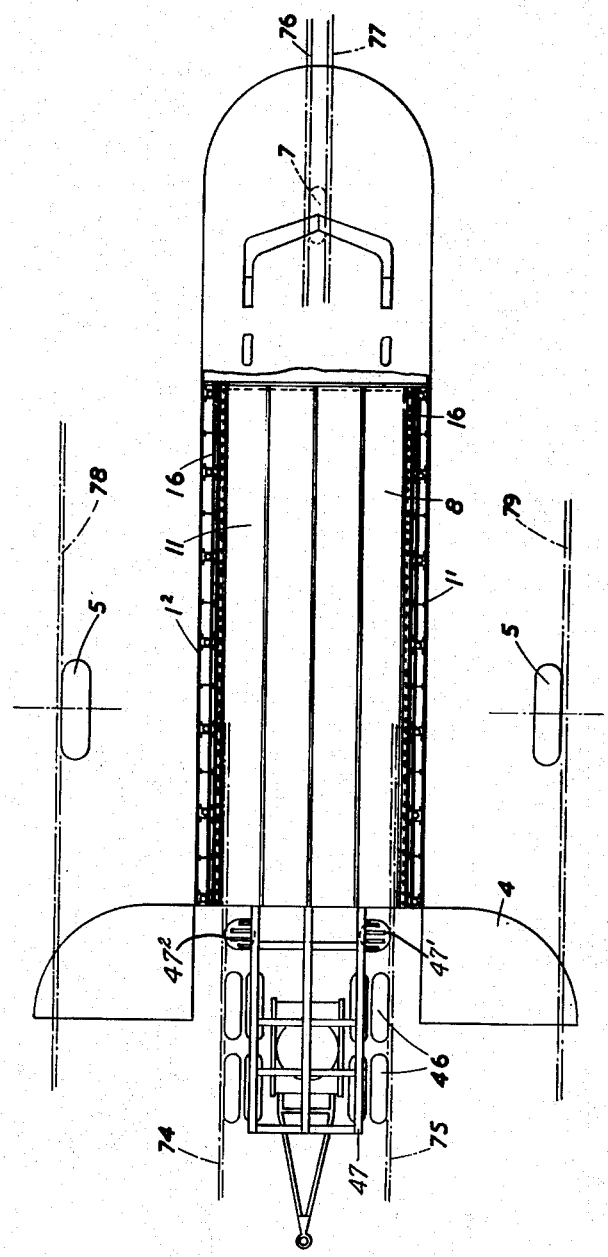
Figure 4:
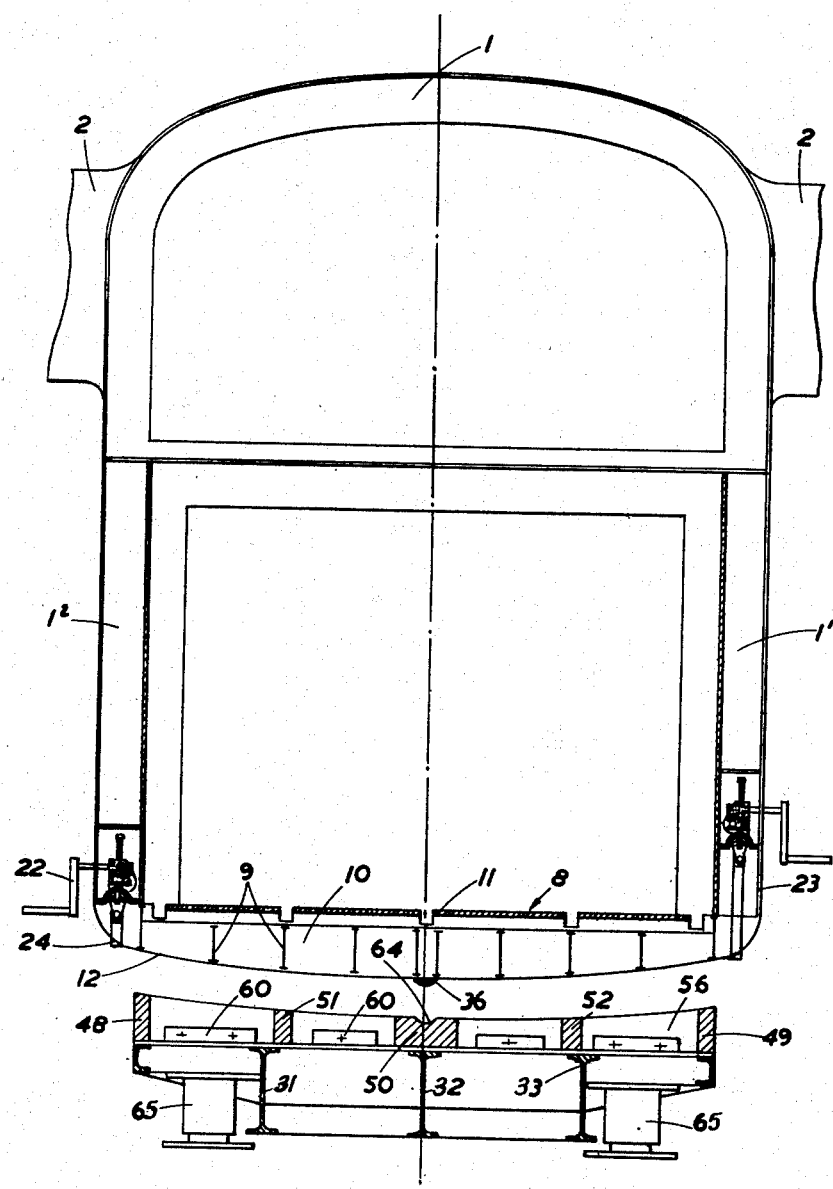
Figure 5:
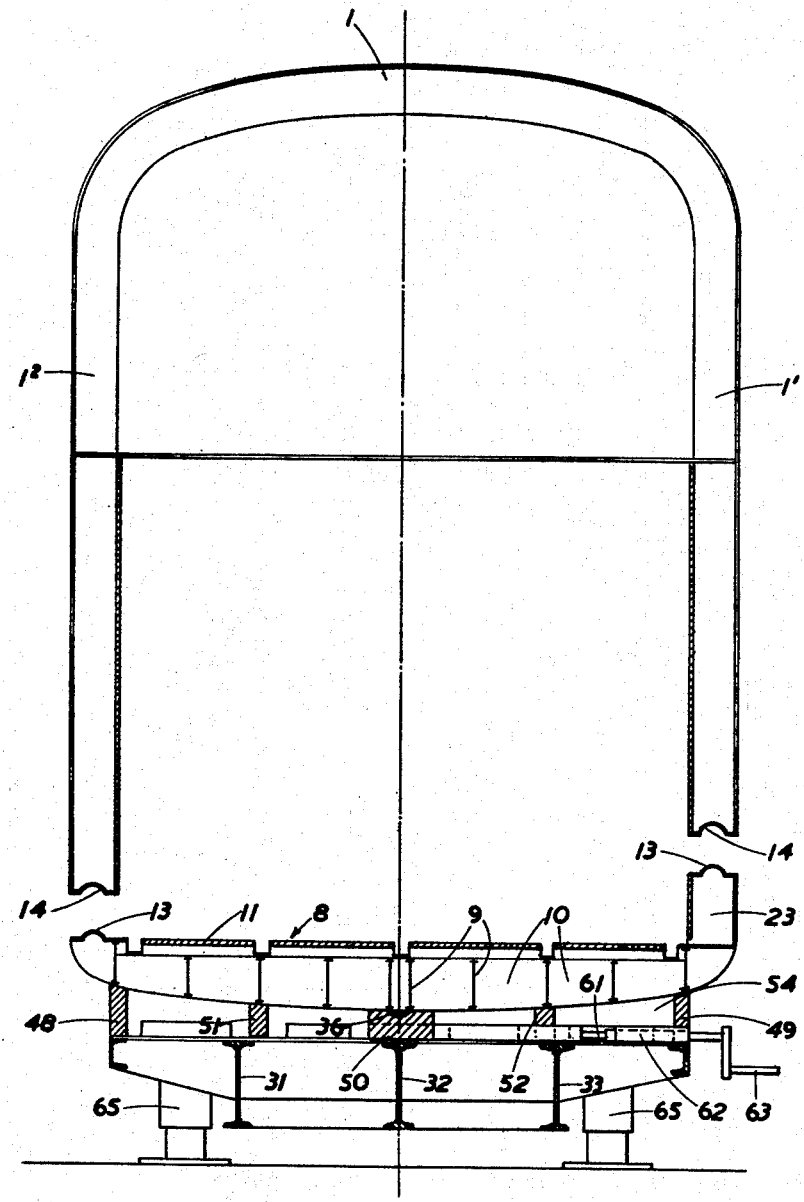
Figure 6:
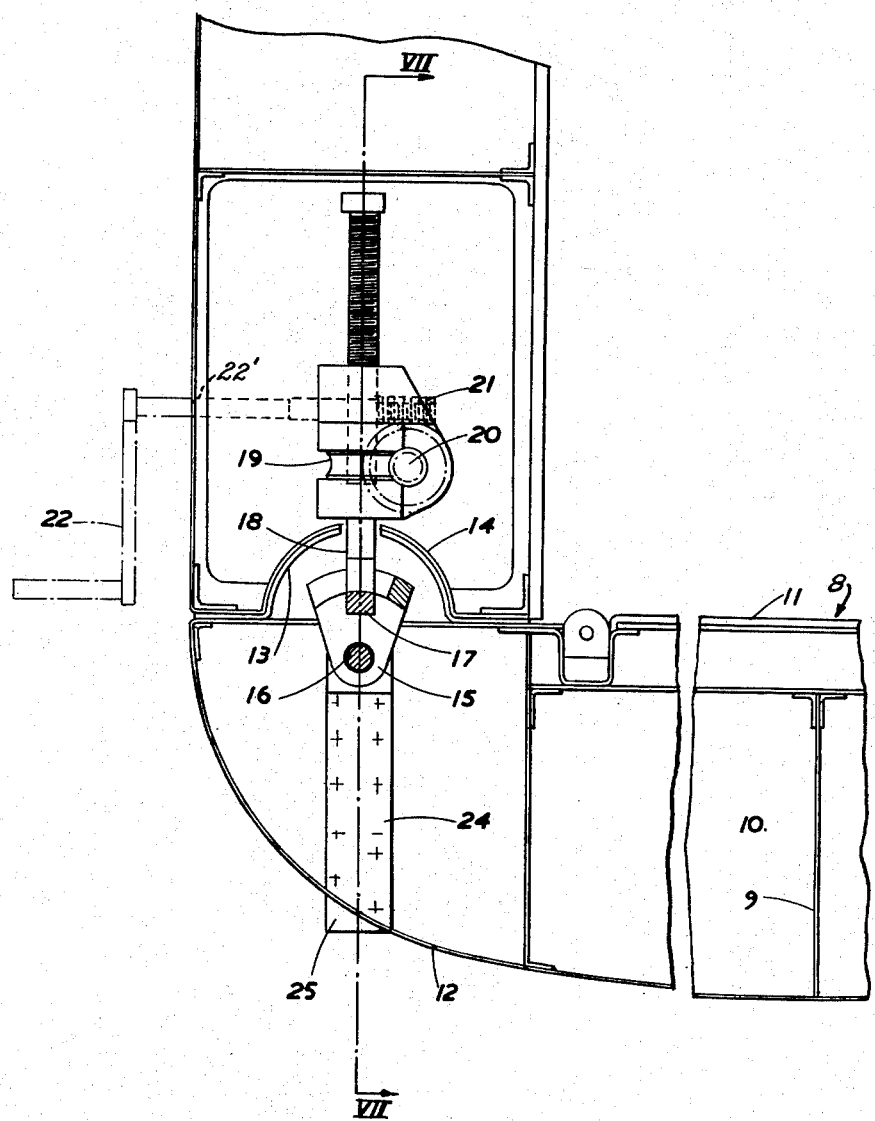
Figure 7:
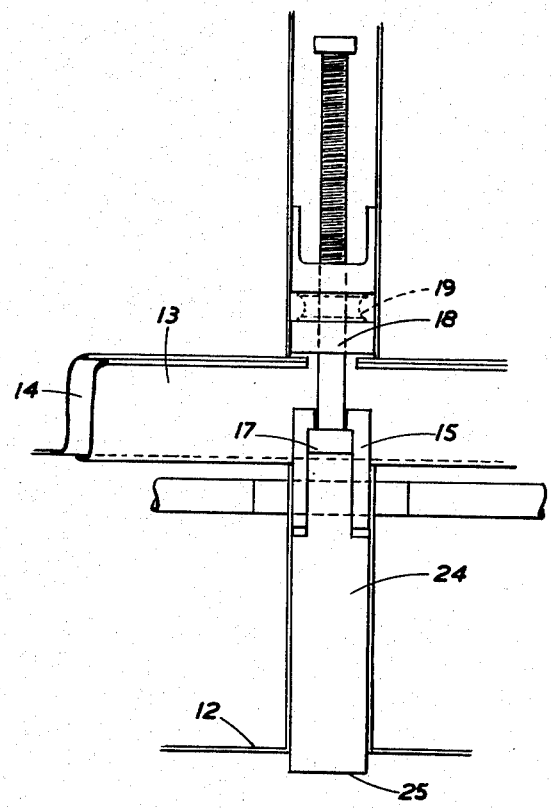

In these drawings:

Fig. 1 is a side elevation of a freight carrying aircraft with the tail unit omitted and showing one end of the transporter vehicle ready to be positioned thereunder, Fig. 2 is a view similar to Fig. 1 with the doors of the freight compartment open, part of the fuselage broken away to show the interior, and a transporter vehicle in position to receive the detachable bottom wall member of the freight compartment, Fig. 3 is a plan sectional view on the line III—III of Fig. 2, Fig. 4 is a transverse section taken on the line IV—IV of Fig. 2, showing on the left hand side the construction illustrated in Fig. 2 and on the right hand side of modified construction of detachable bottom wall member being one formed with a short upwardly extending side, Fig. 5 is a view similar to Fig. 4 being a section on the line V—V and showing the bottom wall member detached from the fuselage and including the modification of the bottom wall member construction, Fig. 6 is a detailed view on an enlarged scale of the left hand lower portion of Fig. 4, and Fig. 7 is a section on the line VII—VII of Fig. 6.

Referring now to the said drawings, and in particular to Fig. 1 thereof, in which the invention is shown applied to what may be regarded as a conventional freight carrying aircraft comprising a main body or fuselage 1 which carries high placed wings 2 which in turn carry engines in the nacelles 3, with the lower part of the fuselage comprising a freight compartment which is closed by clam shell type doors 4 at the rear and at the front by the transverse bulkhead 4'. The main landing wheels 5 are carried by braced struts 6 depending from the wings 2 whilst the nose landing wheel 7 is carried at the fore part of the fuselage.

Now according to the present invention the bottom wall or platform member 8 of the, or the main, freight compartment is separately constructed and is bodily detachable from the walls $1^1$, $1^2$ of the fuselage 1 which bound the sides of the freight compartment.

The precise construction of the detachable bottom member 8 is not material to the invention and, as illustrated, may comprise a plurality of longitudinal members 9 interspaced with transverse members 10 which support a floor 11 and outer skin plating 12.

In one convenient embodiment as illustrated in the left hand side of Fig. 4 and in Fig. 6, the marginal portions of the detachable bottom wall member or platform 8 are formed each with a projecting stiffening rib 13 intended, when the bottom wall member is in position, to nest in a groove formed by the member 14 at the lower edge of each side wall of the fuselage.

The bottom wall member 8 may be attached to the side walls of the fuselage in a variety of ways providing the securing means are positive in action and capable of drawing the sides of the bottom wall member tight up to the butt onto the lower extremities of the walls of the fuselage. Thus as illustrated, connection is effected at a plurality of points by means of bifurcated members 15 fast on a shaft 16 by means of which they may be swung clear of, or to engage with, the heads 17 of members 18 are capable of axial displacement as by threading such members to extend through and mesh with toothed wheels 19 with which engage worms 20 which in turn mesh with gears 21 which may themselves be rotated as by means of a crank handle 22 which may be common to all the connecting means and extend through an aperture $22^1$ in the skin plating of the fuselage. Thus when the bottom wall member is to be disconnected the members 18 are displaced downwardly until the bifurcated members 15 can be swung clear of the heads 17 thereof. The members 18 may then be retracted to prevent their projecting beyond the lower edges of the side walls during the time the bottom wall member 8 is separated therefrom and danger of their being damaged.

When the bottom wall member is to be re-connected the members 18 are lowered until the bifurcated members 15 can re-engage with the heads 17 thereof whereafter the attachment is completed by displacing the members 18 in upward direction so forcing the rib 13 into the groove 14.

In some cases, as for example when it is desired to give extra longitudinal stability to the bottom wall member, it may be formed with an upstanding marginal side edge 23, as shown on the right hand side of Figs. 4 and 5, matching the side walls of the freight compartment of the fuselage and similarly having a longitudinal projecting rib to nest in a groove in the side wall and connecting means of the nature of those just described.

At each connection point trestling pads 24 may be provided with their lower ends 25 projecting through the skin plating 12. These trestling pads form jacking points for supporting the detachable bottom wall member 8 on extensible jacks either for separation from the aircraft or for lifting the bottom wall member from a transporter vehicle, for example a vehicle used for removing and replacing the detachable bottom wall member of the freight compartment as hereafter described, to release such vehicle for positioning another already loaded bottom wall member for connection to the aircraft while that which has been removed is unloaded.

A suitable construction of transporter vehicle may, as illustrated in the drawings, comprise a main chassis composed of, say three, principal longitudinal members 31, 32, 33 (Figs. 4 and 5) which are held in spaced relation by end and intermediate transverse members 34, 35, 36, 37, $37^1$, 38, 39, 40 and 41 (Fig. 2). The main chassis is at one end supported on a plurality of pairs of fixed wheels 41, 42 carried by pairs of members 43, capable of rocking a transverse shaft 45 carried by extensions of the longitudinal members 31, 32, 33 whilst its other end is supported by a plurality of steerable wheels 46 carried by a carriage 44 and connected through a spherical or universal joint to the elevated ends 47 of such longitudinal members 31, 32, 33.

This chassis structure carries an upper deck comprising outer longitudinal members 48, 49 with at least one central member 50 and preferably also intermediate longitudinal members 51, 52 which are interconnected by outer transverse members 53, 54 and intermediate transverse members 55, 56, 57 conveniently at such spacing as to register with the transverse members 10 of the detachable bottom wall member of the freight compartment of the aircraft.

The upper deck is capable of a degree of sideways movement in respect to the chassis structure being side supported in guideways diagrammatically indicated by the reference numeral 60 (Fig. 4), and is interconnected with the main chassis structure by means for controlling and effecting the relative displacement such as the threaded rod 61 (Fig. 5) which extends through a fixed part 62 on the chassis and is rotatable as by means of a handle 63 (Fig. 5).

The central longitudinal member 50 and the midpoints of the transverse members 53 to 57 of the upper deck are recessed to provide a continuous longitudinal groove 64 to receive the projecting rib 36 of the detachable bottom wall member 8 in the case of the embodiment illustrated.

The chassis is also provided with a plurality of jacks 65 of which there may be six with four secured in pairs to its transverse members 37, $37^1$ and 40, $40^1$ of the chassis respectively while two more are carried by the structures $47^1$, $47^2$ provided on the elevated ends 47 of the outer longitudinal members 31 and 33. These jacks 65 may be double expanding hydraulic or other convenient jacks capable of lifting the entire vehicle by the required amount.

The operation of removing and replacing the detachable bottom wall member 8 of the freight compartment of the aircraft whilst utilising a vehicle of the nature described above, is as follows, the aircraft is manoeuvred on the runway, loading bay, or other standing so that its nose wheel 7 is between datum lines 76, 77 provided on such runway or the like whilst its main landing wheels 5 are within datum lines 78, 79. These lines are appropriately positioned relative to datum lines 74, 75 for the wheels 46 of the transporter vehicle so that the same may be accurately positioned under the aircraft fuselage, to receive the detachable bottom wall member 8 as shown in Figs. 2 and 4. Thus after positioning the aircraft, the transporter vehicle is brought into position as accurately as possible whereafter its upper deck is moved into complete alignment with the detachable bottom wall member 8 of the freight compartment.

The vehicle jacks 65 are then extended to lift the vehicle bodily up to the detachable bottom wall member 8 so that the projecting keel or rib 36 of the bottom wall member 8 will lie in the longitudinal groove 60 in the upper deck of the transporter vehicle.

Now with the bottom wall member supported on the elevated vehicle the connection means between the detachable bottom wall member 8 and walls $1^1$, $1^2$ of the fuselage are first slackened and then disconnected as described above. At this time, due to the load being taken off the fuselage, the landing gear of the aircraft will extend and lift the fuselage leaving the bottom wall member 8 on the vehicle as in Fig. 5. On completion of the separation of the bottom wall member 8 from the fuselage, the jacks 65 are collapsed again to bring the vehicle wheels onto the ground and the vehicle is then displaced lengthwise so that the cargo on the bottom wall member 8 emerges through the open doors 4.

Another bottom wall member 8 already loaded with cargo is then brought into position by moving the transporter vehicle carefully along the guide lines 74, 75 so that the cargo enters through the doors 4. Any slight error in positioning the vehicle is adjusted by moving the upper deck thereof whereafter its jacks 65 are extended to lift the bottom wall member 8 for its side edges to engage the lower extremities of the side walls whereupon the connecting means may be engaged to secure the bottom wall member 8 to the aircraft fuselage, and after connection thereto the jacks are retracted and the vehicle removed in readiness for the aircraft to take off.

This changing of one loaded bottom wall member for another loaded bottom wall member is expected to take but a small fraction of the time needed to unload and reload a cargo of freight and the duration may be such that the operation can be carried out during the time necessary to refuel the aircraft.

It will be appreciated that the present invention may be applied to designs of freight aircraft already existing and that little alteration is necessary to the fuselage structure except to provide smooth inner walls to the freight compartment to prevent the load becoming caught on any projecting part during movement into and out of the cargo space.

The present invention not only speeds the turn round of the aircraft and permits an appreciably greater utilisation, but the loading and unloading is facilitated and expedited as access to the freight can be obtained on all four sides of the detached bottom wall member so that the positioning of the cargo and its secure lashing can be carried out quite unhampered by walls or other adjacent structures.

It will be appreciated that as in accordance with the further feature of the invention, the detachable bottom wall member 8 may be subdivided transversely intermediate its length into two or more sections each of which is separately detachable one after another, the outermost first.

I claim:

1. An aircraft of the class described comprising: a fuselage; wall means forming a part of said fuselage and defining a freight compartment; a detachable bottom wall member connected to said fuselage and forming a floor for said freight compartment; and at least one end door included in said wall means through which cargo supported on said freight compartment floor may be moved in and out of said fuselage by longitudinal movement of said bottom wall member when said bottom wall member is detached.

2. An aircraft of the class described comprising: a fuselage; wall means forming a part of said fuselage and defining a freight compartment; a bottom wall member forming a floor for said freight compartment; a plurality of connecting means detachably securing said bottom wall member to said fuselage at a plurality of spaced points along said wall means; and at least one end door included in said wall means through which cargo supported on said freight compartment floor may be moved in and out of said fuselage by longitudinal movement of said bottom wall member when said bottom wall member is detached.

3. An aircraft of the class described comprising: a fuselage; wall means forming a part of said fuselage and defining a freight compartment; a detachable bottom wall member connected to said fuselage and forming a floor for said freight compartment; a pair of upwardly extending stiffening ribs extending along the sides of said removable wall member, said fuselage being recessed to receive said stiffening ribs; and at least one end door included in said wall means through which cargo supported on said freight compartment floor may be moved in and out of said fuselage by longitudinal movement of said bottom wall member when said bottom wall member is detached.

4. An aircraft of the class described comprising: a fuselage; wall means forming a part of said fuselage and defining a freight compartment; a bottom wall member forming a floor for said freight compartment; a pair of upwardly extending stiffening ribs extending along the sides of said removable wall member, said fuselage being recessed to receive said stiffening ribs; a plurality of connecting means detachably securing said bottom wall member to said fuselage at a plurality of spaced points along said wall means; and at least one end door included in said wall means through which cargo supported on said freight compartment floor may be moved in and out of said fuselage by longitudinal movement of said bottom wall member when said bottom wall member is detached.

5. An aircraft of the class described comprising: a fuselage; wall means forming a part of said fuselage and defining a freight compartment; a bottom wall member forming a floor for said freight compartment; a plurality of connecting means detachably securing said bottom wall member to said fuselage at a plurality of spaced points along said wall means, said connecting means comprising means for raising and lowering said bottom wall member; and at least one end door included in said wall means through which cargo supported on said freight compartment floor may be moved in and out of said fuselage by longitudinal movement of said bottom wall member when said bottom wall member is detached.

6. A freight carrying aircraft comprising a fuselage having a top wall, side walls with grooves in their lower edges, end doors, a removable bottom wall providing a support for cargo and stiffening ribs along the side edges of the bottom wall for interlocking with the grooves in said side walls, said bottom wall with its cargo being removable through the end doors, and means for detachably fastening the bottom wall to the side walls.

References Cited in the file of this patent

UNITED STATES PATENTS

| Number | Name | Date |
|---|---|---|
| 1,992,941 | Fowler | Mar. 5, 1935 |
| 2,075,042 | Knerr | Mar. 20, 1937 |
| 2,387,527 | Nagamatsu | Oct. 23, 1945 |
| 2,443,862 | Conklin | Sept. 7, 1948 |
| 2,472,947 | Hlobil | June 14, 1949 |
| 2,476,538 | Fowler | July 19, 1949 |
| 2,557,962 | Greene | June 26, 1951 |
| 2,616,639 | Burnelli | Nov. 4, 1952 |